(12) United States Patent  
Martin et al.

(10) Patent No.: US 8,340,206 B2
(45) Date of Patent: Dec. 25, 2012

(54) SYSTEM FOR MIMO SPATIAL ADAPTIVITY IN DYNAMIC ENVIRONMENTS

(75) Inventors: Carol C. Martin, Fair Haven, NJ (US); John C. Koshy, Jackson, NJ (US); Joseph C. Liberti, Howell, NJ (US); Anthony A. Triolo, Manalapan, NJ (US)

(73) Assignee: TTI Inventions D LLC, Wilmington, DE (US)

( * ) Notice: Subject to any disclaimer, the term of this patent is extended or adjusted under 35 U.S.C. 154(b) by 416 days.

(21) Appl. No.: 12/691,052

(22) Filed: Jan. 21, 2010

(65) Prior Publication Data

US 2011/0013712 A1    Jan. 20, 2011

Related U.S. Application Data

(60) Provisional application No. 61/226,085, filed on Jul. 16, 2009.

(51) Int. Cl.
*H04B 7/02* (2006.01)
(52) U.S. Cl. ........................................................ 375/267
(58) Field of Classification Search .................. 370/328, 370/338; 375/267; 455/69, 101, 423
See application file for complete search history.

(56) References Cited

U.S. PATENT DOCUMENTS

| 7,542,454 | B2 | 6/2009 | Lin et al. | |
|---|---|---|---|---|
| 2005/0181739 | A1* | 8/2005 | Krasny et al. | 455/69 |
| 2006/0056533 | A1* | 3/2006 | Molisch et al. | 375/267 |
| 2006/0105761 | A1* | 5/2006 | Walton et al. | 455/423 |
| 2008/0182611 | A1* | 7/2008 | Han et al. | 455/522 |
| 2009/0036155 | A1* | 2/2009 | Wu et al. | 455/522 |
| 2009/0093265 | A1* | 4/2009 | Kimura et al. | 455/500 |

FOREIGN PATENT DOCUMENTS

| WO | 2008069547 A1 | 6/2008 |
|---|---|---|
| WO | WO-2008069547 A1 * | 6/2008 |

OTHER PUBLICATIONS

Catreux, S., et. al., "Adaptive Modulation and MIMO Coding for Broadband Wireless Data Networks." IEEE Communications Magazine, Jun. 2002, p. 108-115.
Heath, R., et. als., "Switching Between Multiplexing and Diversity Based on Constellation Distance." 38th Annual Allerton Conference on Communications Control and Computing, Monticello, IL, Sep. 30-Oct. 2, 2000.
Written Opinion on PCT/US2010/042040, mailed Sep. 23, 2010.
International Search Report dated Sep. 23, 2010, 2 pages.

* cited by examiner

*Primary Examiner* — Leon-Viet Nguyen (57) ABSTRACT

An adaptive wireless multiple-input multiple-output (MIMO) system switches among two or more modes of operation including Uninformed Transmitter (UT) and Informed Transmitter (IT) modes based on channel conditions as reflected in a set of metrics including a temporal selectivity metric (TSM) indicative of the temporal dynamics of the MIMO channel. In an exemplary embodiment, the adaptive MIMO system uses a dominant eigenmode IT mode of operation if a signal-to-noise ratio is below a threshold, otherwise, the system uses an IT mode or a UT mode based on the TSM. If the TSM indicates a channel that is changing too rapidly for feedback to be effective, the UT mode is used, otherwise the IT mode is used. Overall system capacity in time varying MIMO channels is thereby improved.

32 Claims, 5 Drawing Sheets

SYSTEM FOR MIMO SPATIAL ADAPTIVITY IN DYNAMIC ENVIRONMENTS

RELATED PATENT APPLICATIONS

This application claims the benefit under 35 U.S.C. §119 (e) of U.S. Provisional Application No. 61/226,085, filed Jul. 16, 2009, the entire contents of which are hereby incorporated by reference for all purposes into this application.

GOVERNMENT LICENSE RIGHTS

This invention was made with Government support under DAAD19-01-2-0011 awarded by the US Army Research Laboratory. The Government has certain rights in this invention.

FIELD OF THE INVENTION

This invention relates generally to spatial adaptivity methods and apparatus for wireless multiple-input multiple-output (MIMO) applications operating in variable multipath environments.

BACKGROUND OF THE INVENTION

The multipath environment for a mobile wireless system can change rapidly and dramatically while a vehicle is in motion. Multiple-input multiple-output (MIMO) systems use the multipath in an environment to increase data rate by communicating over multiple parallel streams. In a typical MIMO system, the channel is estimated at the receiver, and information about the channel conditions fed back to the transmitter so that the transmitter can more effectively distribute power across the multiple parallel streams. This type of MIMO with feedback is called Informed Transmitter (IT) MIMO. If no information about the channel is available at the transmitter, the MIMO system can blindly place equal power on each of the parallel streams. This type of open-loop operation is called Uninformed Transmitter (UT) MIMO.

Many times, to reduce complexity in a realizable system, IT MIMO uses only the dominant mode of the channel to perform the MIMO processing. At low signal-to-noise ratio (SNR), dominant mode IT MIMO outperforms UT MIMO when the channel feedback is fast enough to keep up with changing channel conditions. At higher SNR, however, or when the feedback rate is too slow compared to the rate at which the channel is changing, UT MIMO outperforms dominant mode IT MIMO. A problem in practical implementations of MIMO systems that has not been addressed is adapting the operation of such a system to a channel that is changing at a rate that is too fast for IT MIMO feedback to keep up.

Studies of adaptive MIMO have considered adaptive modulation and coding based on parameters such as SINR, but have not addressed adaptive feedback methods. (See, e.g., S. Catreux, V. Erceg, D. Gesbert, and R. W. Heath, "Adaptive modulation and MIMO coding for broadband wireless data networks," IEEE Comm. Mag., June 2002.) Heath and Paulraj proposed a method for switching between using MIMO and beamforming by measuring constellation distance, but did not consider the feedback channel. (R. W. Heath and A. Paulraj, "Switching between multiplexing and diversity based on constellation distance," Proc. of Allerton Conf. on Comm., Control and Comp., September 2000.)

Thus, whereas known approaches have considered ways of changing modulation and other parameters based on channel conditions, there are no known approaches which consider whether or not to use feedback in the system.

BRIEF SUMMARY OF THE INVENTION

In an exemplary embodiment, the present invention provides an adaptive wireless multiple-input multiple-output (MIMO) system that switches among two or more modes of operation including Uninformed Transmitter (UT) and Informed Transmitter (IT) modes based on channel conditions as reflected in a set of metrics including a temporal selectivity metric (TSM) indicative of the temporal dynamics of the MIMO channel. In an exemplary embodiment, the adaptive MIMO system uses a dominant IT mode if a signal-to-noise ratio is below a threshold, otherwise, the system uses an IT mode or a UT mode based on the TSM. If the TSM indicates a channel that is changing too rapidly for feedback to be effective, the UT mode is used, otherwise the IT mode is used.

In an exemplary embodiment, the TSM is based on the autocorrelation of the channel estimate evaluated at a time offset that is the function of the maximum Doppler shift and the feedback delay of the system. When this autocorrelation-based TSM falls below a specified threshold, the MIMO system switches to UT mode.

In a further exemplary embodiment, the TSM is based on the rate at which the received signal level crosses a predetermined threshold. If the level crossing rate exceeds a predetermined threshold, the MIMO channel is deemed to be changing too rapidly for the IT mode feedback to be useful and the MIMO system switches to the UT mode.

In view of the above, and as will be apparent from the detailed description, other embodiments and features are also possible and fall within the principles of the invention.

BRIEF DESCRIPTION OF THE DRAWINGS

A more complete understanding of the present disclosure may be realized by reference to the accompanying drawings in which.

DETAILED DESCRIPTION

The following merely illustrates principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable media and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Figure 1A:
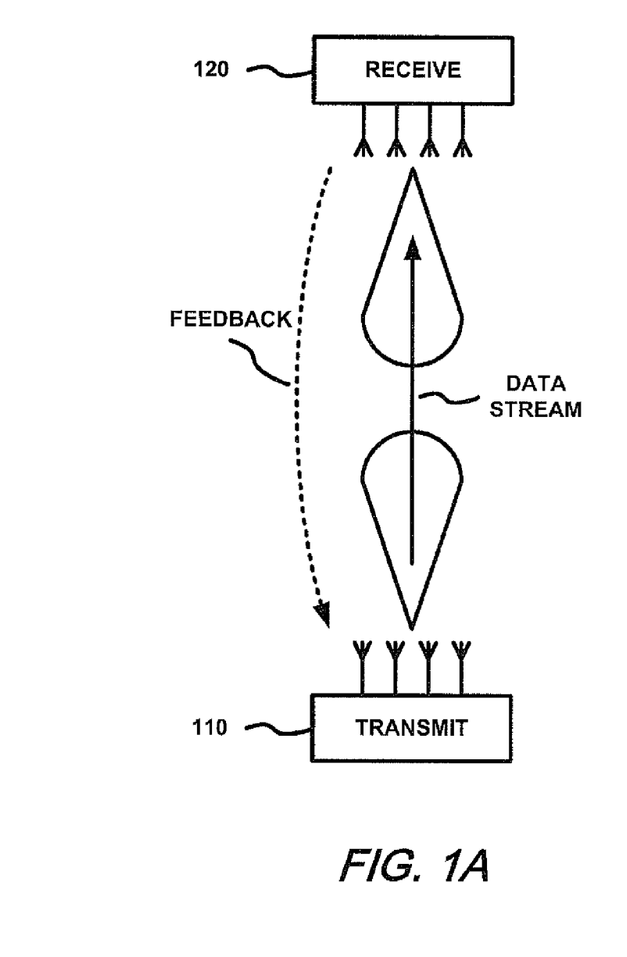
FIGS. 1A and 1B depict an exemplary adaptive MIMO system operating in an open, unobstructed environment, and a cluttered, rich multipath environment, respectively.
Figure 1B:
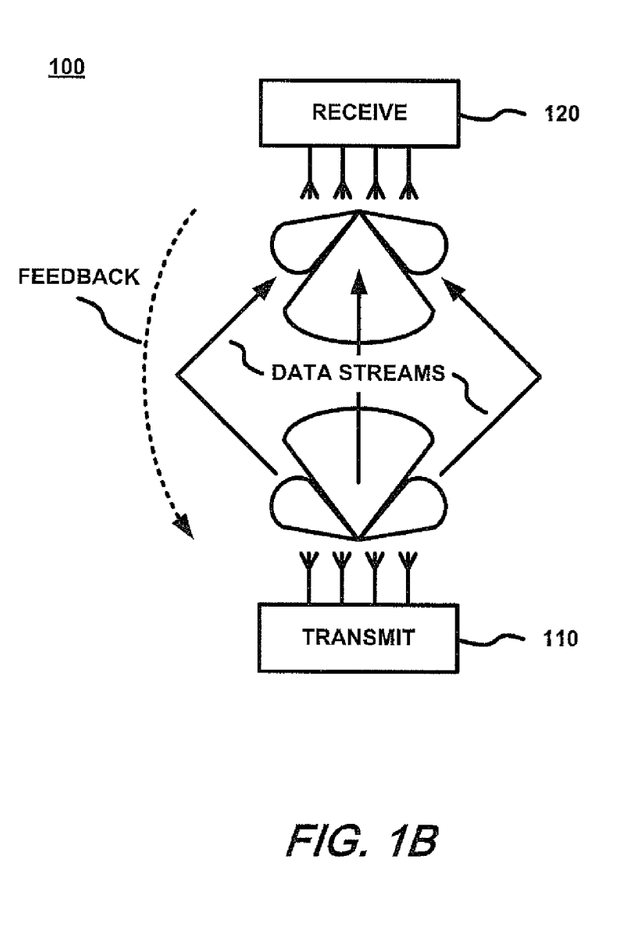

Turning now to FIGS. 1A and 1B, there is shown a schematic representation of an exemplary adaptive multiple-input multiple-output (MIMO) system 100 that changes operating mode in response to characteristics of the surrounding propagation environment. The system 100 comprises transceiving MIMO communication units 110 and 120, which are shown in communication with each other over a wireless MIMO communication link with feedback. For purposes of illustration, MIMO communication unit 110 is shown to be transmitting and unit 120 as receiving, although, as transceivers, both are capable of transmitting and receiving, simultaneously or in a time-division duplexed manner, for example. Each MIMO communication unit 110, 120 has multiple (e.g., four) antennas which can be used to transmit and receive and which can be powered in any suitable combination when transmitting. It is contemplated that MIMO communication units 110 and 120 are mobile, as in vehicular applications, but need not be.

FIGS. 1A and 1B illustrate two of a multiplicity of environments in which the exemplary adaptive MIMO system 100 may operate. FIG. 1A illustrates an open, unobstructed environment that is not rapidly changing, such as when the relative velocity of the MIMO communication units 110, 120 is low, but in which the signal-to-noise ratio (SNR) is relatively low, such as when the distance between the MIMO units is large. FIG. 1B, by contrast, illustrates a cluttered, rich multipath environment, with high or low relative velocity, but with a relatively high SNR.

In accordance with principles of the invention described in greater detail below, when operating in the environment of FIG. 1A, MIMO communication units 110, 120 will transmit and receive using an informed transmitter (IT) mode with dominant eigenmode beamforming (also referred to herein as DOM IT mode). When operating in the environment of FIG. 1B, however, MIMO communication units 110, 120 will switch to an IT scheme using multiple eigenmode beamforming (referred to herein as FULL IT mode), or an uniformed transmitter (UT) mode to increase spectral efficiency.

As described in greater detail below, the mode of operation of system 100 is selected in accordance with channel conditions as reflected in a set of metrics determined by the system. In FULL IT mode, the transmitting unit uses eigenmode beamforming to form multiple beams transmitting a different signal on each beam. The transmitting unit can allocate the power per eigenmode in an optimal manner using, for example, a "water-filling" solution to effectively maximize capacity over the channel. By allowing multiple signals to be sent through the channel at the same time, in the same bandwidth, FULL IT mode beamforming creates, in effect, multiple "spatial" channels. This permits the MIMO system to achieve capacity that is much higher than that achievable, for example, by a Single-Input Single-Output (SISO) or a Single-Input Multiple Output (SIMO) system which has one transmit antenna and supports one spatial channel at a time. The parallel channels can be processed independently, each with independent modulation and coding, allowing per-mode rate control and simplifying receiver processing. This approach gives MIMO systems the ability to achieve high spectral efficiencies.

Under certain conditions, DOM IT mode is used in which the transmitting unit transmits a single stream using multiple transmit antennas by multiplying the signal to be transmitted by a different complex weight for each antenna, thereby creating a high-gain beam. Even though only a single stream is transmitted, DOM IT mode can be the optimal MIMO mode in terms of data capacity for predominantly line-of-sight (LOS) channels or when the transmitting unit is power constrained.

Under certain conditions, UT mode is used in which the transmitting MIMO unit transmits a different signal from each of its antennas with the power equally distributed over the antennas. Because the multiple transmitted signals interfere with each other, the receiving MIMO unit is responsible for separating the different data streams. As will be seen below, because UT mode will provide better performance than the IT modes under certain conditions, the system may operate in UT mode even with knowledge of the channel.

Figure 2:
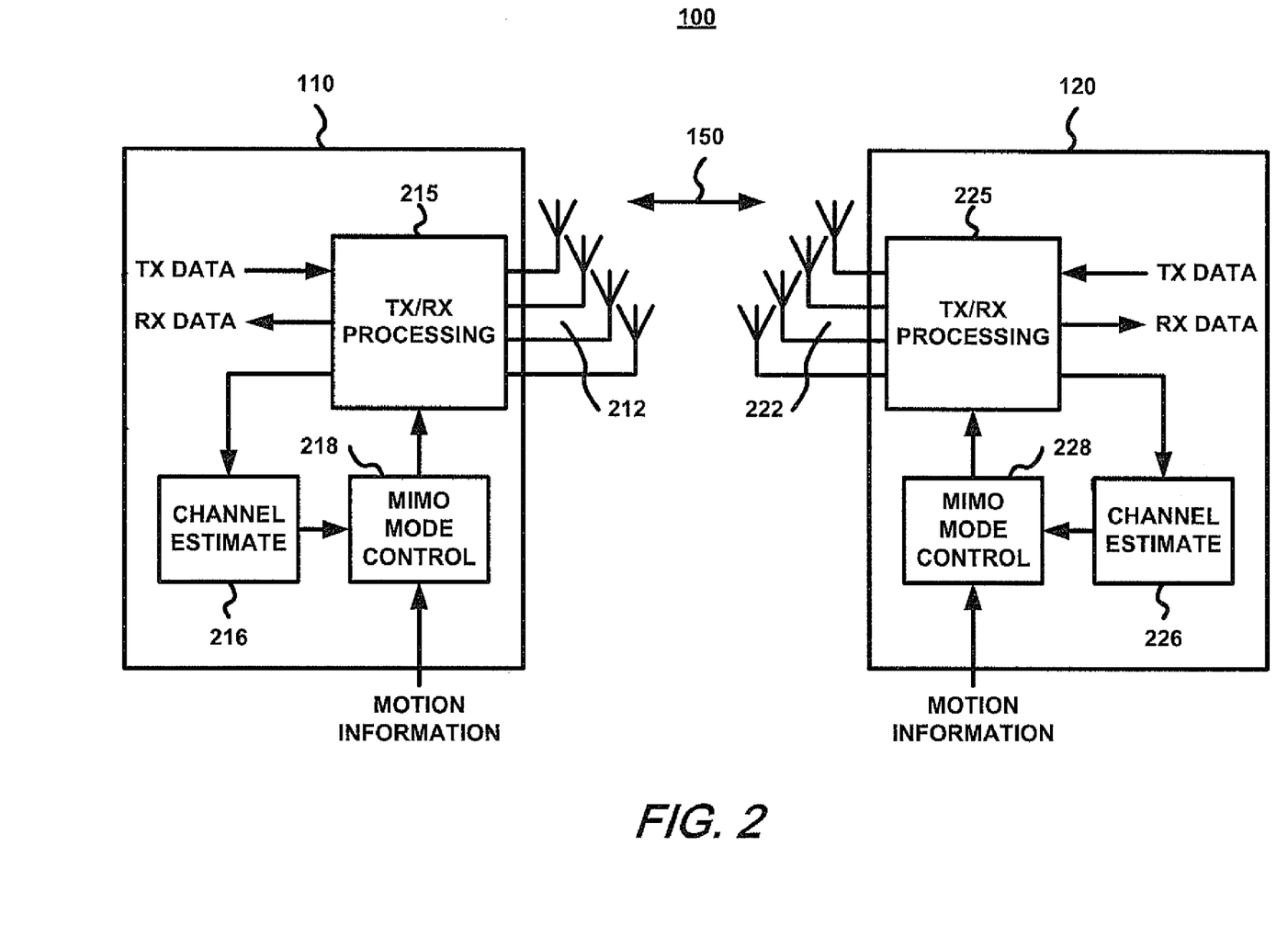
FIG. 2 is a block diagram of an exemplary MIMO system with two MIMO transceivers in accordance with the principles of the disclosure.

FIG. 2 shows a high-level block diagram of adaptive MIMO system 100 with transceiving MIMO units 110 and 120 communicating over a bidirectional wireless MIMO link 150. The link 150 is assumed to be time-division duplexed, so that when one unit is transmitting, the other is receiving. In an exemplary embodiment, unit 110 transmits during a first part of a frame while unit 120 receives, and unit 120 transmits during a second part of the frame while unit 110 receives. Both user data and system overhead, such as feedback data, are conveyed via link 150. In IT modes, channel state information (CSI) is fed-back from one unit to the other once per frame with a one-frame delay. The duration of a frame is preferably commensurate with the rate of change of the channel, so that CSI is substantially constant over a frame.

As shown in FIG. 2, MIMO units 110 and 120 are configured symmetrically, with each having similar functional blocks: transmit/receive processing blocks 215, 225; channel estimate blocks 216, 226; and MIMO mode control blocks 218, 228, respectively. A brief overview of the operation of system 100 will now be provided, with greater detail provided further below.

When MIMO unit 110 is transmitting and MIMO unit 120 is receiving, transmit/receive processing block 215 drives antennas 212 to convey user transmit data (TX DATA) and/or feedback data to MIMO unit 120 over the MIMO communication link 150. Transmit/receive processing block 225 processes the signals received via antennas 222 of unit 120 to generate user receive data (RX DATA) and/or feedback data.

Based on signals received and processed by transmit/receive processing block 225, channel estimate block 226 estimates the channel between MIMO units 110 and 120. Using channel estimate information from block 226, MIMO mode control block 228 selects the MIMO mode of operation for the system 100. MIMO mode control block 228 may also receive additional information, such as motion information from a global positioning system (GPS), which it can use in selecting the MIMO mode, as described in greater detail below.

The MIMO mode selected by MIMO mode control block 228 is conveyed via feedback to MIMO unit 110 so that transmit/receive processing block 215 can adapt its transmit processing accordingly. Transmit/receive processing block 225 of MIMO unit 120 will also adapt its receive processing based on the MIMO mode selected by MIMO mode control block 228.

As can be appreciated, the operation of system 200 when unit 120 is transmitting and unit 110 is receiving follows the above description symmetrically. In either case, the MIMO mode control block 218, 228 of the receiving MIMO unit 110, 120 selects the MIMO mode used by both units. A more detailed description of the operation of system 100 is provided below.

Note that in other embodiments, the MIMO mode control block 218, 228 of the transmitting MIMO unit selects the MIMO mode used by both units 110, 120. Moreover, CSI may be available at the transmitting unit without feedback from the receiving unit 120 by exploiting reciprocal properties of propagation, such as by using the channel estimate that the transmitting unit's channel estimate block 216 generated when unit 110 was the receiving unit.

Figure 3:
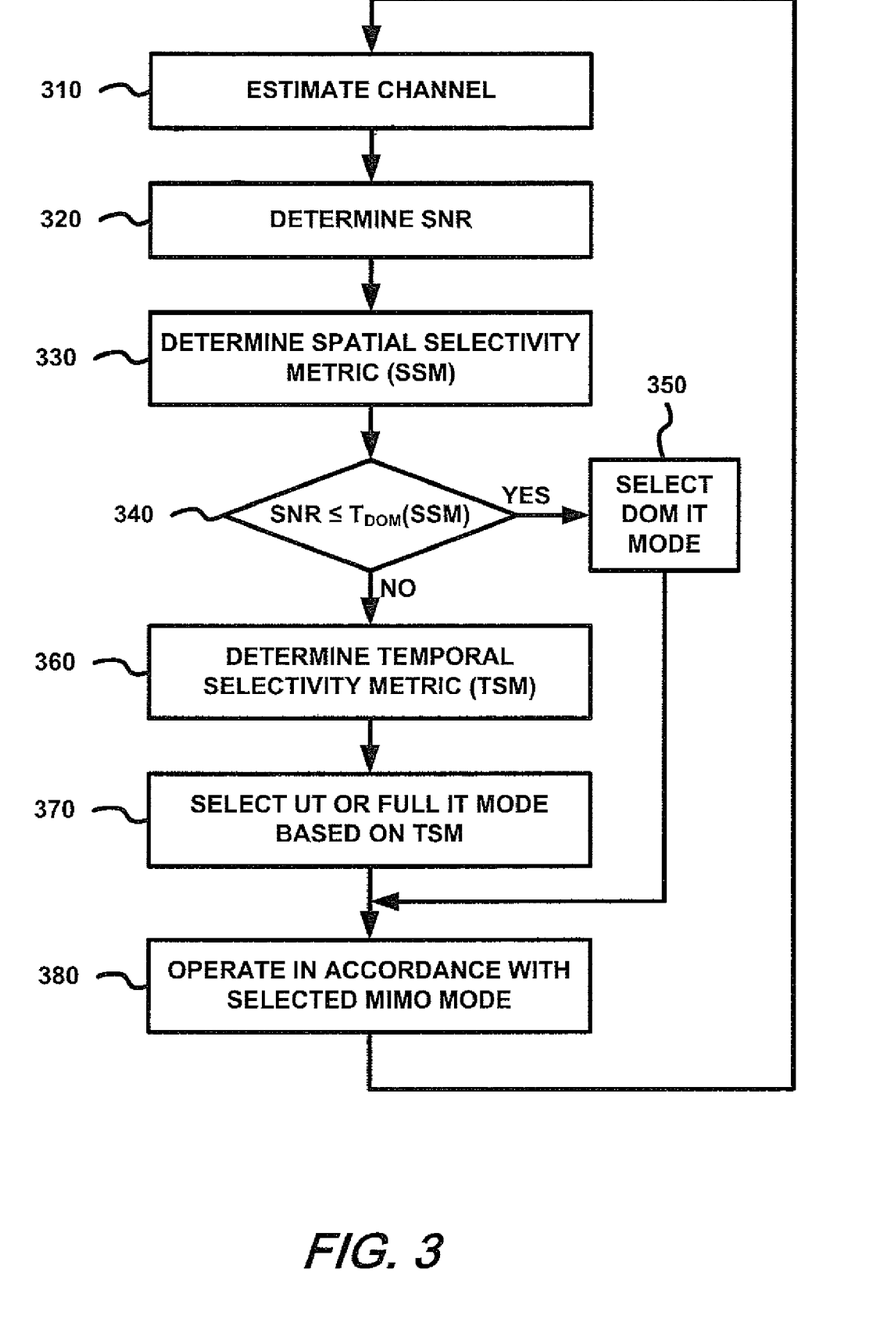
FIG. 3 is a flowchart of an exemplary adaptive MIMO method in accordance with the principles of the disclosure.

FIG. 3 is a flowchart of an exemplary adaptive MIMO method of operation of an exemplary adaptive MIMO system such as system 100 of FIG. 2. As shown in FIG. 3, at step 310, the receiving MIMO unit, which for purposes of this description will be unit 120, estimates the channel between it and the transmitting MIMO unit 110. In an exemplary system, training-based channel estimation is implemented in which known training symbols transmitted by the transmitting MIMO unit 110 are used by the receiving MIMO unit to estimate the channel. Using the known training symbols T, the maximum likelihood estimate of the channel $\hat{H}$, is given by $$\hat{H}=RT^{H}(TT^{H})^{-1} \quad (1)$$

where R is the matrix of the received training symbols and $T^H$ denotes the conjugate transpose of T.

The MIMO channel can be decomposed into independent and parallel spatial channels commonly referred to as eigenmodes. These orthogonal channels are obtained by performing the singular value decomposition (SVD) of the estimated channel matrix $\hat{H}$ as $$\hat{H}=U\Sigma V^{H}, \quad (2)$$

where U and V, referred to as the receive and transmit correlation matrices, respectively, are unitary matrices representing the left and right eigenvectors of $\hat{H}$, respectively, and $\Sigma$ is a diagonal matrix of the singular values of $\hat{H}$.

At step 320, the SNR associated with each of the eigenmodes of the estimated channel is determined. The signal strength of an eigenmode is proportional to its eigenvalue. The noise can be estimated by a variety of suitable techniques. One way is to measure the signal received at the receiving MIMO unit 120 during a time period that the other MIMO unit 110 is not transmitting. The distribution of SNRs will vary with channel conditions. If there is a dominant eigenmode, as is the case in an LOS environment, the SNR for that eigenmode is used below. If the SNRs are more equally distributed, however, an average of the SNRs may be used.

At step 330, a spatial selectivity metric (SSM) is determined. In an exemplary embodiment, the distribution of the eigenvalues of the receive and transmit correlation matrices, U and V, respectively, is determined and used as the SSM. The SSM can be determined as described, for example, in Forenza, A. Pandharipande, H. Kim, and R. W. Heath, "Adaptive MEMO transmission scheme: Exploiting the spatial selectivity of wireless channels," in *Proc. IEEE Veh. Technol. Conf.*, May 2005, or D. W. Bliss, A. M. Chan, N. B. Chang, "MIMO Wireless Channel Phenomenology," *IEEE Trans. Ant. and Prop.*, Vol 52, No. 8, August 2004. Eigenvalue distribution is one of several spatial selectivity metrics that can be used in embodiments of the invention.

The SSM thus determined can be used as an indication of how specular or diffuse the channel is between MIMO units 110 and 120 and can be used to estimate the Rician K-factor (the ratio of the power of the specular or dominant path signal to the power of the diffuse or Rayleigh path signal) characterizing the channel.

At step 340, the SNR determined at step 320 is compared to a threshold $T_{DOM}$ whose value is a function of the SSM determined at step 330. If it is determined at step 340 that the SNR is no greater than the threshold value, $T_{DOM}$, operation proceeds to step 350 in which the DOM IT mode is selected as the MIMO mode of operation for the system. In an exemplary embodiment, the threshold value $T_{DOM}$ is relatively low, such as less than approximately 10 dB. FIG. 1A depicts the exemplary system 100 operating in DOM IT mode in a low SNR scenario.

Figure 4:
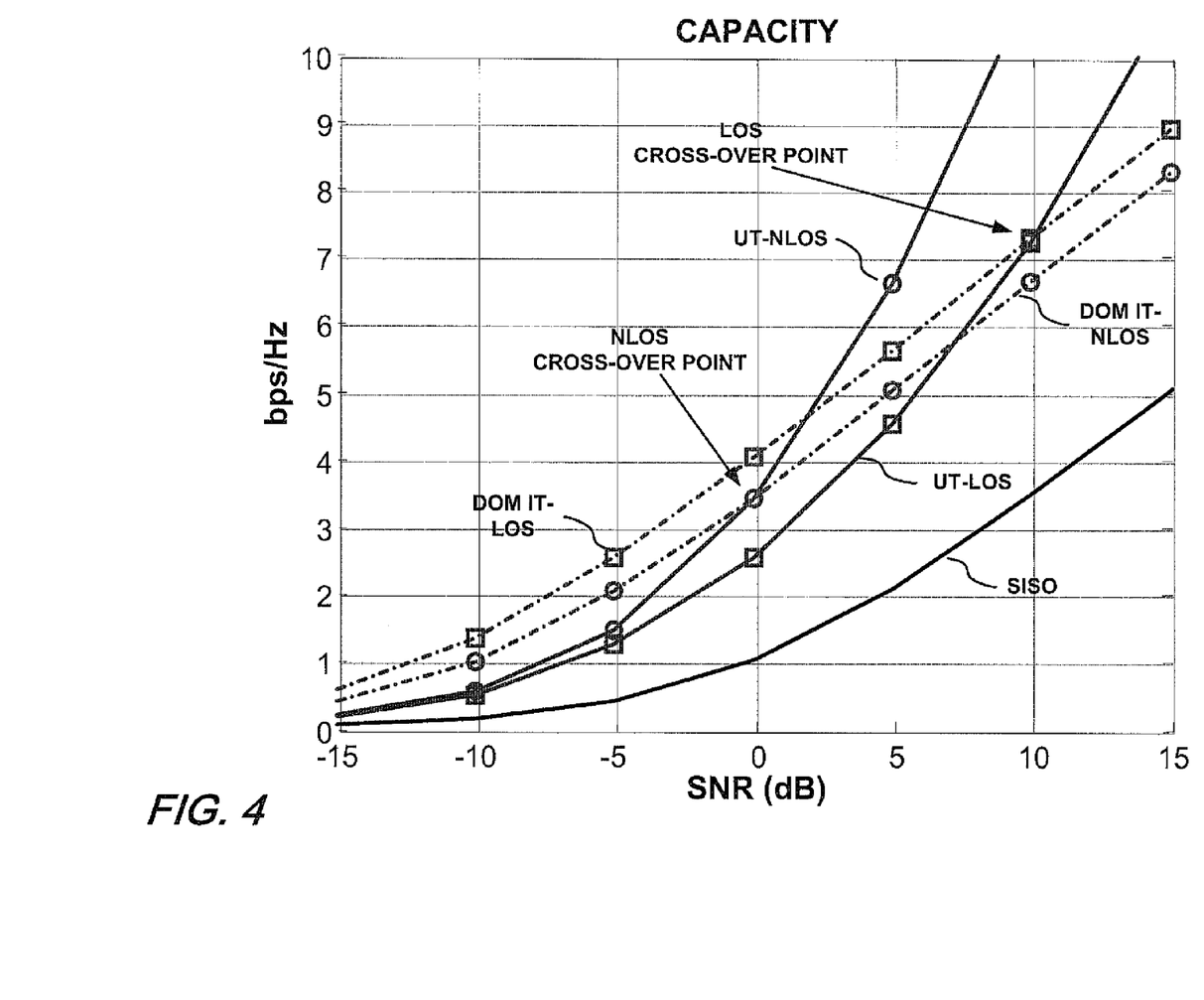
FIG. 4 shows a graph of channel capacity with respect to SNR for different MIMO modes and channel spatial conditions.

FIG. 4 shows curves of the ergodic channel capacities, as a function of SNR, for the DOM IT and UT modes, each with line-of-sight (LOS) and non-line-of-sight (NLOS) channel models. For the LOS channel models, the curves shown in FIG. 4 were generated based on a Rician K factor of 20 dB. For purposes of comparison, the capacity for SISO operation is also shown.

As shown in FIG. 4, for lower SNR generally, DOM IT mode provides better channel capacity performance than UT mode. For an NLOS channel, DOM IT mode provides better performance at SNR values below approximately 0 dB, whereas for a LOS channel (with K=20 dB), DOM IT mode provides better performance at SNR values below approximately 10 dB. Using the value of the SSM determined at step 330 as an indication of the Rician K-factor of the channel, the value of threshold $T_{DOM}$ used in step 340 can be determined as a function of SSM. In an exemplary embodiment, the SSM can be used as an index into a look-up table of values for $T_{DOM}$, among other possibilities. Based on the values depicted in FIG. 4, such a look-up table would have a value for $T_{DOM}$ of approximately 0 dB for an SSM value indicative of an NLOS channel, and a value of approximately 10 dB for an SSM value indicative of an LOS channel with a Rician K-factor of 20 dB. For channel conditions yielding SSM values indicative of smaller Rician K-factors, it is contemplated that the corresponding values of $T_{DOM}$ will be between approximately 0 and 10 dB.

As shown in FIG. 3, if it is determined at step 340 to select DOM IT mode in step 350, operation then proceeds to step

380 in which the MIMO system adopts the DOM IT mode and operates accordingly. Step 380 is described below in greater detail.

Figure 5:
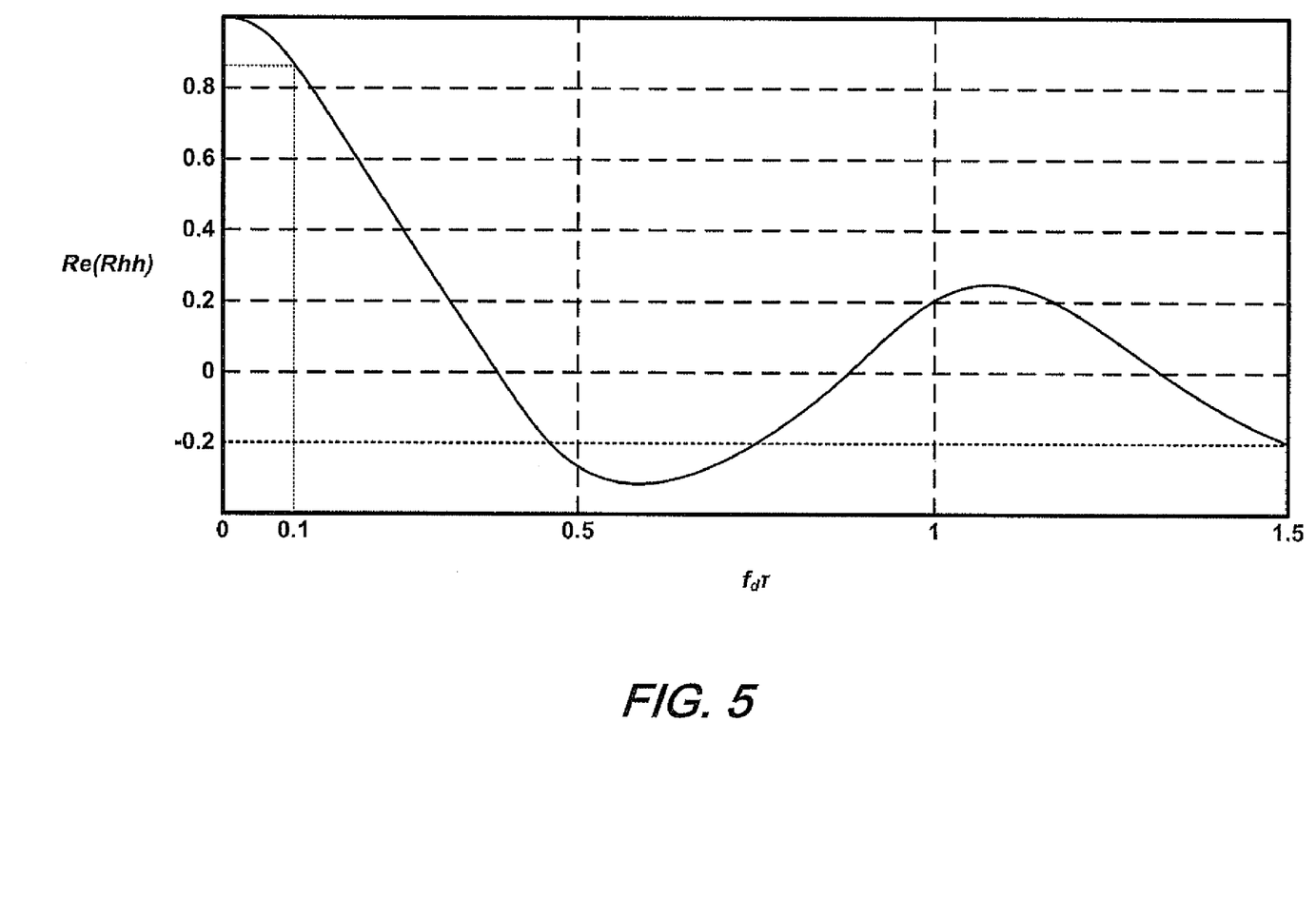
FIG. 5 shows a graph of the real part of the autocorrelation of the estimated channel as a function of the product of the Doppler rate and feedback delay.

If it is determined at step 340 not to use DOM IT mode, operation proceeds to step 360 in which a temporal selectivity metric (TSM) is determined. In an exemplary embodiment, the TSM is a function of the autocorrelation of the channel estimate $\hat{H}$ evaluated at an offset of $f_d\tau$, where $f_d$ is the maximum Doppler shift and $\tau$ is the feedback delay of the system. FIG. 5 shows a graph of the real part of the autocorrelation (Rhh) of the estimated channel as a function of $f_d\tau$ for an illustrative channel environment.

In an exemplary embodiment, the feedback rate is preferably at least ten times greater than the Doppler rate, or in other words, $f_d\tau \leq 0.1$. Under such a condition, the bit error rate (BER) will be at a reasonable level (e.g., $\leq 5\%$).

The maximum Doppler shift can be determined from the relative velocity of the MIMO units 110, 120 or it can be estimated based on the channel autocorrelation. In an exemplary embodiment, one or more channel metrics such as channel autocorrelation and/or BER are determined periodically, such as every feedback period or frame (e.g., the channel autocorrelation is determined with a time offset $\tau$.) Given the known feedback delay $\tau$, $f_d$ can be estimated from the channel autocorrelation. The relative velocity of the units can be determined using any of a variety of known methods with data from external sources, such as a GPS system, provided to the MIMO mode control blocks 218, 228 of MIMO units 110, 120. The maximum Doppler shift can be determined from the channel autocorrelation estimate based on thresholds obtained, for example, from offline system simulations. In this embodiment, lower TSM values are indicative of a rapidly changing channel, whereas higher TSM values are indicative of a more slowly changing channel.

In a further exemplary embodiment, a level crossing rate of the signal transmitted from the transmitting MIMO unit 110 to the receiving MIMO unit 120 is used as the TSM. That is, the envelope of the transmitted RF signal, as received at the receiving MIMO unit 120, is compared to a reference level. The number of crossings of the reference level by the RF signal envelope within a given period is counted and used as the TSM. In this embodiment, higher TSM values are indicative of a rapidly changing channel, whereas lower TSM values are indicative of a more slowly changing channel. The reference level can be determined, for example, using an offline system simulation.

Once the TSM has been determined at step 360, operation proceeds to step 370 in which either UT mode or FULL IT mode is selected based on the TSM. If the TSM indicates a channel that is changing too rapidly for FULL IT mode to be useful, UT mode is selected, otherwise, FULL IT mode is selected. This selection can be based, for example, on a comparison of the TSM to a threshold value. For an embodiment in which the TSM varies inversely with the rate of channel change such as one in which the TSM is based on the channel autocorrelation as described above, if the TSM does not exceed the applicable threshold value, UT mode is selected, otherwise FULL IT mode is selected. In an exemplary embodiment, TSM=Re(Rhh) and the applicable threshold is approximately 0.85. As shown in FIG. 5, this threshold value corresponds to $f_d\tau=0.1$.

For an embodiment in which the TSM varies directly with the rate of channel change, such as one in which the TSM is based on the rate of RF signal level crossings as described above, if the TSM exceeds the applicable threshold value, UT mode is selected, otherwise FULL IT mode is selected. The applicable threshold values are preferably functions of the feedback rate and can be determined, for example, using an offline system simulation.

In a further exemplary embodiment, more than one TSM may be determined in step 360 and used in step 370 in selecting between UT and FULL IT modes. For instance, a first TSM1 based on autocorrelation and a second TSM2 based on RF signal level crossings are determined at step 360. At step 370, TSM1 and TSM2 are compared to respective thresholds and based on those comparisons, UT or FULL IT mode is selected. If there is a disagreement between the two comparisons, one or the other mode can be selected by default, the current MIMO mode can be maintained, or the MIMO mode can be changed, among other possibilities.

In yet a further exemplary embodiment, TSM=$f_d\tau$. If the TSM exceeds a predetermined threshold (e.g., 0.1), the channel is changing too rapidly for IT mode to be effective, in which case UT mode is selected. If, however, the TSM does not exceed the threshold, FULL IT mode is selected. The TSM threshold can be determined, for example, using an offline system simulation. Different values for the threshold can be selected, for example, based on the desired BER.

Once the MIMO mode of operation has been selected at 350 or 370, operation then proceeds to step 380 in which the operation of the MIMO system switches to the selected MIMO mode. In addition to adapting the transmit processing at the transmitting MIMO unit 110, the receive processing at the receiving MIMO unit 120 will also be adapted in accordance with the selected MIMO mode.

If FULL IT mode is selected, the receiving unit 120 will feed-back the transmit correlation matrix V (or its equivalent, such as a corresponding codebook index) to the transmitting unit 110 for use in that unit's transmit processing 215. The transmitting unit spatially filters the parallel transmit data streams by multiplying them by V, thereby transmitting the data streams on the eigenmodes of the channel. The power allocated to each eigenmode is obtained through water-filling on the eigenvalues of the channel. Higher power is allocated to stronger eigenmodes and reduced or no power is allocated to weaker eigenmodes. At low SNRs, dropping the weaker eigenmodes and allocating more power to the stronger eigenmodes leads to better overall system error performance since the weaker eigenmodes tend to have a higher error rate. As SNR increases, power is allocated across more eigenmodes, eventually approaching equal power.

In FULL IT mode, the receiver processing uses the conjugate transpose of the receive correlation matrix U to form an estimate Z of the transmitted symbol vector, $$Z=U^H R \quad (3)$$

where R is the received signal.

When operating in DOM IT mode, the transmitter spatially filters a single data stream by the right eigenvector corresponding to the largest (or dominant) singular value of $\hat{H}$ whereby the data stream is sent on the strongest eigenmode of the channel. All of the transmit power is allocated to the dominant eigenmode.

In DOM IT mode, the receiver processing uses the conjugate transpose of the left eigenvector corresponding to the largest (or dominant) singular value of $\hat{H}$, $$Z=u_{max}^H R. \quad (4)$$

When operating in UT mode, without channel information, the transmitter cannot optimize its power allocation across antennas or spatially filter the data streams. An exemplary strategy is to allocate equal power to each transmit antenna, resulting in a transmitter covariance matrix equal to the scaled identity matrix:

$$R_T = P_{tot}/N_T I_{N_T}, \qquad (5)$$

where $P_{tot}$ is the total transmit power and $N_T$ is the number of transmit antennas.

In UT mode, the signals are mixed upon transmission. The receiver estimates the channel using the training symbols and then decouples the individual data streams. Maximum likelihood (ML) detection can be used to perform joint-detection of the simultaneously transmitted co-channel streams. Although an ML receiver achieves optimal performance, its complexity can be quite high. Zero-forcing (ZF) or minimum mean squared error (MMSE) spatial-filtering schemes are examples of simpler linear signal separation techniques. Such techniques offer low complexity solutions for decoupling the streams, but at the expense of performance. To further enhance performance, iterative detection and demodulation techniques can be used, such as described in J. C. Liberti et al., "Experimental results using a MIMO Test Bed for wideband, high spectral efficiency tactical communications," *MILCOM 2005*, October 2005.

In an exemplary system, an MMSE spatial filter is used in the receive processing (in transmit/receive processing block 215, 225) at the receiving MIMO unit when operating in UT mode. MMSE takes into account the relative strengths of the noise and the inter-stream interference to strike an optimal balance between nulling and matched filtering. At low SNR, the MMSE filter behaves like a matched filter. At high SNR, where the inter-stream interference dominates, MMSE performs nulling.

Thus in UT mode, the receiver forms an MMSE estimate of the transmitted symbols by spatially filtering the received vector $$Z = ((E_s \hat{H} \hat{H}^H + P_n)^{-1} \hat{H} E_s)^H R, \qquad (6)$$

where $E_s$ is the average energy per symbol and $P_n$ is a diagonal matrix of the average noise power per receive antenna element.

After step 380, operation loops back to step 310 to repeat the mode selection process. In an exemplary embodiment, the mode selection process is performed by the MIMO mode control block 218, 228 of each MIMO unit 110, 120 when that MIMO unit is the receiving unit. Thus, for instance, in an exemplary time-division duplexed arrangement, the mode selection process is performed by a mode control block 218, 228 every other frame. The mode selection process may be performed more or less frequently, depending on channel conditions.

In the exemplary method of FIG. 3, a MIMO mode is selected based on the SNR, SSM and TSM as determined above. An additional parameter that can be considered in selecting modes is the desired bit error rate (BER). In an exemplary embodiment, MIMO mode selection is carried out using a look-up table which maps SNR, SSM and TSM into data rate performance for each of the three MIMO modes, FULL IT, DOM IT and UT, in which the MIMO system can operate. For the given SNR, SSM and TSM values, the MIMO mode that provides the highest data rate (for the desired BER) is selected. The data rate performance for the various modes as a function of SNR, SSM and TSM can be determined, for example, using offline system simulation. The results of the simulation can then be used to build a look-up table used to select the MIMO mode.

In an exemplary embodiment of system 100 depicted in FIG. 2, each MIMO mode control block 218, 228 can be implemented, for example, using a microcontroller programmed to carry out MIMO selection as described, with the aforementioned look-up tables stored, for example, in a memory area of the microcontroller, among other possible implementations.

At this point, while we have discussed and described the invention using some specific examples, those skilled in the art will recognize that our teachings are not so limited. Accordingly, the invention should be only limited by the scope of the claims attached hereto.

What is claimed is:

1. A method comprising:
   estimating a channel between a first communication unit and a second communication unit;
   determining a spatial selectivity metric based at least in part on the channel estimate;
   determining a temporal selectivity metric indicative of at least one or more temporal dynamics of the estimated channel;
   selecting one of a plurality of spatial operating modes in accordance with at least one of the spatial selectivity metric and the temporal selectivity metric, wherein at least one of the plurality of spatial operating modes is an uninformed transmitter (UT) mode and at least another of the plurality of spatial operating modes is an informed transmitter (IT) mode; and
   operating at least one of the first and second communication units in accordance with the selected spatial operating mode.

2. The method of claim 1, further comprising:
   determining a signal-to-noise ratio (SNR) based on the channel estimate; and
   selecting a dominant eigenmode IT mode if the SNR is below a threshold value, wherein the threshold value is determined in accordance with the spatial selectivity metric.

3. The method of claim 1, further comprising selecting the UT mode if the temporal selectivity metric indicates that the channel is changing too quickly for the IT mode.

4. The method of claim 1, wherein determining the temporal selectivity metric includes determining an autocorrelation of the channel estimate.

5. The method of claim 4, wherein the autocorrelation is determined by evaluating the channel estimate with a time offset that is a function of a Doppler shift and a feedback delay.

6. The method of claim 1, wherein determining the temporal selectivity metric includes determining a level crossing rate of a signal received by at least one of the first and second communication units.

7. The method of claim 1, wherein determining the spatial selectivity metric includes determining an eigenvalue distribution of the channel estimate.

8. The method of claim 1, wherein the first and second communication units alternate between receiving and transmitting and wherein-estimating the channel, determining the spatial selectivity metric, determining the temporal selectivity metric, and selecting one of the plurality of spatial operating modes are carried out at the receiving communication unit.

9. The method of claim 1, wherein operating the at least one of the first and second communication units includes performing at least one of a maximum likelihood (ML), zero-forcing (ZF), and minimum mean squared error (MMSE) detection.

10. The method of claim 1, wherein operating the at least one of the first and second communication units includes transmitting with equal power from a plurality of antennas when operating in UT mode.

11. An apparatus comprising:
a channel estimator, wherein the channel estimator estimates a channel between the apparatus and another communications apparatus;
a multiple-input multiple-output (MIMO) mode controller, wherein the MIMO mode controller:
determines a spatial selectivity metric based at least in part on the channel estimate;
determines a temporal selectivity metric indicative of at least one or more temporal dynamics of the estimated channel; and
selects one of a plurality of spatial operating modes in accordance with at least one of the spatial selectivity metric and the temporal selectivity metric, wherein at least one of the plurality of spatial operating modes is an uninformed transmitter (UT) mode and at least another of the plurality of spatial operating modes is an informed transmitter (IT) mode; and
a processing block, wherein the processing block controls at least one of transmit processing and receive processing in accordance with the selected spatial operating mode.

12. The apparatus of claim 11, wherein the MIMO mode controller determines a signal-to-noise ratio (SNR) based on the channel estimate, and selects a dominant eigenmode IT mode if the SNR is below a threshold value, wherein the threshold value is determined in accordance with the spatial selectivity metric.

13. The apparatus of claim 11, wherein the MIMO mode controller selects the UT mode if the temporal selectivity metric indicates that the channel is changing too quickly for the IT mode.

14. The apparatus of claim 11, wherein the MIMO mode controller determines the temporal selectivity metric by determining an autocorrelation of the channel estimate.

15. The apparatus of claim 14, wherein the MIMO mode controller determines the autocorrelation by evaluating the channel estimate with a time offset that is a function of a Doppler shift and a feedback delay.

16. The apparatus of claim 11, wherein the MIMO mode controller determines the temporal selectivity metric by determining a level crossing rate of a signal received by the apparatus.

17. The apparatus of claim 11, wherein the MIMO mode controller determines the spatial selectivity metric by determining an eigenvalue distribution of the channel estimate.

18. The apparatus of claim 11, wherein the apparatus alternates between receiving and transmitting and wherein the MIMO mode controller selects one of the plurality of spatial operating modes when the apparatus is receiving.

19. The apparatus of claim 11, wherein the processing block includes at least one of a maximum likelihood (ML) detector, a zero-forcing (ZF) detector, and a minimum mean squared error (MMSE) detector.

20. The apparatus of claim 11, wherein the processing block transmits with equal power from a plurality of antennas when operating in UT mode.

21. The method of claim 1, further comprising:
determining, for each of the plurality of spatial operating modes, a data rate of the channel based on at least one of the spatial selectivity metric and the temporal selectivity metric; and
selecting the one of the plurality of spatial operating modes that has a highest data rate for a desired bit error rate.

22. The apparatus of claim 11, wherein the MIMO mode controller is further configured to:
determine, for each of the plurality of spatial operating modes, a data rate of the channel based on at least one of the spatial selectivity metric and the temporal selectivity metric; and
select the one of the plurality of spatial operating modes that has a highest data rate for a desired bit error rate.

23. A tangible computer-readable medium having instructions stored thereon, the instructions comprising:
instructions to estimate a channel between a first communication unit and a second communication unit;
instructions to determine a spatial selectivity metric based at least in part on the channel estimate;
instructions to determine a temporal selectivity metric indicative of at least one or more temporal dynamics of the estimated channel;
instructions to select one of a plurality of spatial operating modes in accordance with at least one of the spatial selectivity metric and the temporal selectivity metric, wherein at least one of the plurality of spatial operating modes is an uninformed transmitter (UT) mode and at least another of the plurality of spatial operating modes is an informed transmitter (IT) mode; and
instructions to operate at least one of the first and second communication units in accordance with the selected spatial operating mode.

24. The tangible computer-readable medium of claim 23, further comprising:
instructions to determine a signal-to-noise ratio (SNR) based on the channel estimate; and
instructions to select a dominant eigenmode IT mode if the SNR is below a threshold value, wherein the threshold value is determined in accordance with the spatial selectivity metric.

25. The tangible computer-readable medium of claim 23, further comprising instructions to determine an autocorrelation of the channel estimate, wherein the temporal selectivity metric is determined based at least in part on the autocorrelation.

26. The tangible computer-readable medium of claim 23, further comprising instructions to determine a level crossing rate of a received signal, wherein the temporal selectivity metric is determined based at least in part on the level crossing rate.

27. The tangible computer-readable medium of claim 23, further comprising instructions to determine an eigenvalue distribution of the channel estimate, wherein the spatial selectivity metric is determined based at least in part on the eigenvalue distribution.

28. A method comprising:
determining a signal-to-noise ratio of a channel between a first communication unit and a second communication unit;
determining a spatial selectivity metric of the channel;
comparing the signal-to-noise ratio to a threshold, wherein the threshold is based at least in part on the spatial selectivity metric; and
selecting an informed transmitter mode with dominant eigen-mode beam-forming as a spatial operating mode of at least one of the first and second communication units if the signal-to-noise ratio does not exceed the threshold.

29. The method of claim 28, further comprising determining a temporal selectivity metric if the signal-to-noise ratio exceeds the threshold.

30. The method of claim 29, further comprising determining, based at least in part on the temporal selectivity metric, an operating mode to use if the signal-to-noise ratio exceeds the threshold.

31. The method of claim 29, wherein the temporal selectivity metric is determined based at least in part on the channel.

32. The method of claim 31, further comprising performing an autocorrelation of the channel, wherein the temporal selectivity metric is based at least in part on the autocorrelation.

* * * * *

UNITED STATES PATENT AND TRADEMARK OFFICE
CERTIFICATE OF CORRECTION

PATENT NO. : 8,340,206 B2
APPLICATION NO. : 12/691052
DATED : December 25, 2012
INVENTOR(S) : Martin et al.

Page 1 of 1

It is certified that error appears in the above-identified patent and that said Letters Patent is hereby corrected as shown below:

In the Specification

In Column 5, Line 52, after Equation, insert -- , --.

In Column 6, Line 16, delete "MEMO" and insert -- MIMO --, therefor.

In the Claims

In Column 10, Line 58, in Claim 8, delete "wherein-estimating" and insert -- wherein estimating --, therefor.

Signed and Sealed this
Eighteenth Day of June, 2013

Teresa Stanek Rea
*Acting Director of the United States Patent and Trademark Office*